(12) United States Patent
Lee et al.

(10) Patent No.: US 10,871,856 B2
(45) Date of Patent: Dec. 22, 2020

(54) DISPLAY DEVICE FOR VEHICLE

(71) Applicant: LG ELECTRONICS INC., Seoul (KR)

(72) Inventors: Chui Hee Lee, Seoul (KR); Hyunkyu Kim, Seoul (KR); Kibong Song, Seoul (KR); Sangkyeong Jeong, Seoul (KR); Jun Young Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/557,923

(22) Filed: Aug. 30, 2019

(65) Prior Publication Data

US 2019/0384480 A1    Dec. 19, 2019

(30) Foreign Application Priority Data

Jul. 23, 2019  (KR) ........................ 10-2019-0089174

(51) Int. Cl.
| | |
|---|---|
| *G06F 3/041* | (2006.01) |
| *B60K 35/00* | (2006.01) |
| *B60W 40/08* | (2012.01) |
| *B60R 11/04* | (2006.01) |
| *G06F 3/0488* | (2013.01) |
| *B60K 37/02* | (2006.01) |

(52) U.S. Cl.
CPC .......... *G06F 3/04186* (2019.05); *B60K 35/00* (2013.01); *B60K 37/02* (2013.01); *B60R 11/04* (2013.01); *B60W 40/08* (2013.01); *G06F 3/0488* (2013.01)

(58) Field of Classification Search
CPC ........ B60K 2370/11; B60K 2370/1438; B60K 2370/199; B60K 35/00; B60K 37/02; B60K 37/06; B60R 11/04; B60W 40/08; G06F 3/04186; G06F 3/0488; G06F 3/04886
USPC ....................................................... 345/156
See application file for complete search history.

(56) References Cited

U.S. PATENT DOCUMENTS

| | | | | |
|---|---|---|---|---|
| 10,592,916 | B1 * | 3/2020 | DeLorean | G08G 1/095 |
| 10,635,225 | B2 * | 4/2020 | Seok | G06F 3/0416 |
| 2003/0030555 | A1 * | 2/2003 | Cole | B60Q 1/444 |
| | | | | 340/479 |
| 2004/0100419 | A1 * | 5/2004 | Kato | G09G 5/00 |
| | | | | 345/7 |
| 2010/0295754 | A1 * | 11/2010 | Cernasov | G06F 3/0325 |
| | | | | 345/8 |
| 2011/0141066 | A1 * | 6/2011 | Shimotani | G06F 3/04886 |
| | | | | 345/177 |
| 2012/0078572 | A1 * | 3/2012 | Bando | G08G 1/0112 |
| | | | | 702/150 |
| 2012/0218177 | A1 * | 8/2012 | Pang | G06F 3/0484 |
| | | | | 345/156 |
| 2013/0232003 | A1 * | 9/2013 | Yeo | G09F 9/33 |
| | | | | 705/14.49 |
| 2014/0160074 | A1 * | 6/2014 | Ryoo | G06F 3/043 |
| | | | | 345/175 |

(Continued)

*Primary Examiner* — Tony O Davis
(74) *Attorney, Agent, or Firm* — Lee, Hong, Degerman, Kang & Waimey

(57) ABSTRACT

According to at least one embodiment, a display device for a vehicle includes: a display module configured to be installed in the vehicle and configured to display a GUI (Graphical User Interface); and a processor configured to change a touch area corresponding to the GUI according to a motion of the vehicle.

20 Claims, 19 Drawing Sheets

(56) References Cited

U.S. PATENT DOCUMENTS

| | | | | |
|---|---|---|---|---|
| 2016/0266778 A1* | 9/2016 | Rawlinson | ............. | B60K 35/00 |
| 2016/0266782 A1* | 9/2016 | Rawlinson | ............. | B60K 37/00 |
| 2019/0005610 A1* | 1/2019 | Tillotson | .......... | B64D 11/00153 |
| 2019/0009676 A1* | 1/2019 | Yokota | .................. | G06F 3/0484 |
| 2019/0025974 A1* | 1/2019 | Seok | ...................... | B62D 1/046 |
| 2019/0121522 A1* | 4/2019 | Davis | ................. | G06F 3/04817 |
| 2019/0384480 A1* | 12/2019 | Lee | ........................ | B60K 35/00 |

\* cited by examiner

DISPLAY DEVICE FOR VEHICLE

CROSS-REFERENCE TO RELATED APPLICATION

Pursuant to 35 U.S.C. § 119(a), this application claims the benefit of earlier filing date and right of priority to Korean Patent Application No. 10-2019-0089174, filed on Jul. 23, 2019, the contents of which are hereby incorporated by reference herein in their entirety.

BACKGROUND

1. Technical Field

Embodiments of the present disclosure relate to a display device for a vehicle, which changes a touch area of a GUI (Graphical User Interface) displayed at (or by) a display module according to a motion of the vehicle.

2. Description of the Related Art

Recent vehicles provide various functions such as listening to music, watching video, making a phone call and sending/receiving a message, in addition to a basic driving function. In order to provide such functions, the vehicles have an HMI (Human Machine Interface).

The HMI for a vehicle includes a plurality of input/output modules, and receives a user operation or outputs a screen and voice in response to the user operation, through the input/output modules.

Recently developed vehicles have a plurality of displays as the input/output modules, and the HMI for a vehicle receives a user operation by sensing a touch on the display, or provides various pieces of information to a driver through the display.

More specifically, various GUIs (Graphical User Interfaces) are displayed on the display, and the HMI for a vehicle executes an application corresponding to a GUI according to a user's touch inputted onto the GUI.

The size of the display may inevitably be limited by the internal space of a vehicle, and the sizes of the GUIs displayed on the display are also limited. Therefore, when the vehicle significantly moves, it may be difficult for the driver in the vehicle to accurately input a touch onto a specific GUI. In this situation, an application different from what the driver intended may be executed.

Furthermore, when the application different from what the driver intended is executed, the driver may attempt performing another touch to cancel the executed application. In this situation, however, even if the touch is not accurately inputted, the driving concentration of the driver may be rapidly lowered, thereby causing an accident.

SUMMARY

Various embodiments are directed to a display device for a vehicle, which changes a touch area of a GUI according to a motion of the vehicle.

Also, various embodiments are directed to a display device for a vehicle, which changes a touch area of a GUI according to a user's touch habit.

Also, various embodiments are directed to a display device for a vehicle, which updates a touch area of a GUI in consideration of trial and error in a user's touch.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

According to at least one embodiment, a display device for a vehicle may include: a display module configured to be installed in the vehicle and configured to display a GUI; and a processor configured to change a touch area corresponding to the GUI according to a motion of the vehicle.

DETAILED DESCRIPTION

Figure 1:
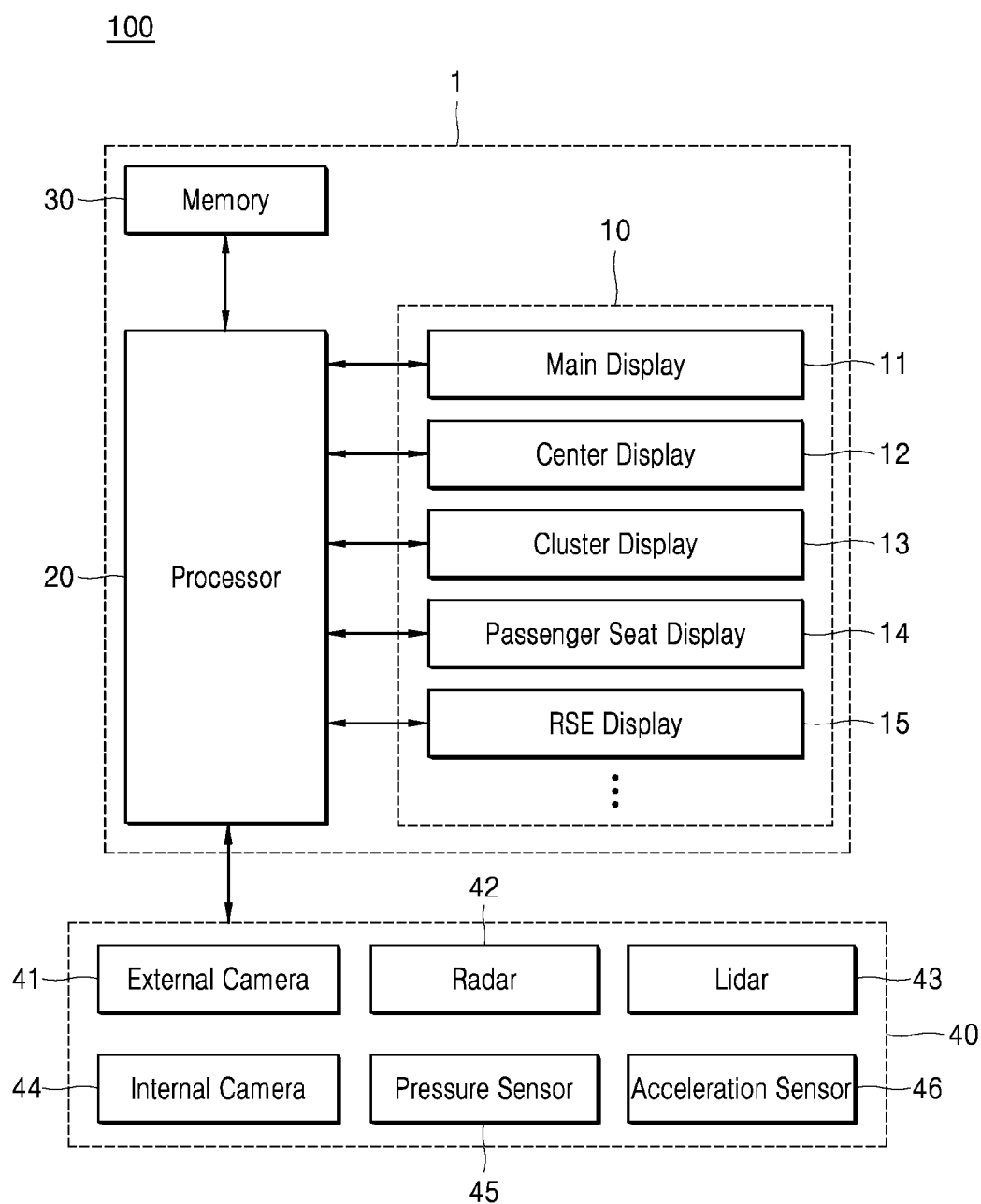
FIG. 1 is a partial internal block diagram of a vehicle including a display device according to at least one embodiment of the present disclosure.

The above-described purposes, features and advantages will be described in detail with reference to the accompanying drawings. Thus, technical features of embodiments of the present disclosure will be able to be easily carried out by those skilled in the art to which the present disclosure pertains. Moreover, in describing embodiments of the present disclosure, detailed descriptions related to publicly known functions or configurations associated with the present disclosure will be omitted in order not to unnecessarily obscure the description of the present disclosure. Hereafter, various embodiments of the present disclosure will be described in detail with reference to the accompanying drawings. The same reference numerals in the drawings are used to represent like or similar components.

Hereafter, when an arbitrary component is referred to as being disposed "at the top (or bottom)" of a component or "over (or under)" the component, it may not only indicate that the arbitrary component is disposed in contact with the top surface (or bottom surface) of the component, but may also indicate that another component can be interposed between the component and the arbitrary component disposed over or under the component.

Embodiments of the present disclosure relate to a display device for a vehicle, which changes a touch area of a GUI (Graphical User Interface) displayed at (or by) a display module according to a motion of the vehicle.

Hereafter, a vehicle and a display device installed in the vehicle according to at least one embodiment of the present disclosure will be described in detail with reference to the accompanying drawings.

Figure 2:
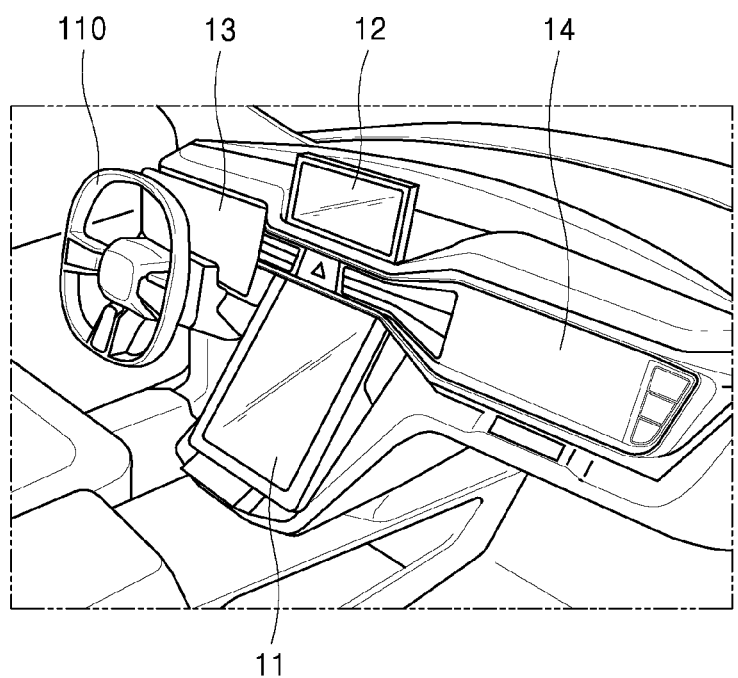
FIG. 2 is a diagram for describing various implementations of a display module illustrated in FIG. 1.

FIG. 1 is a partial internal block diagram of a vehicle including a display device according to at least one embodiment of the present disclosure, and FIG. 2 is a diagram for describing various implementations of a display module illustrated in FIG. 1.

Figure 3:
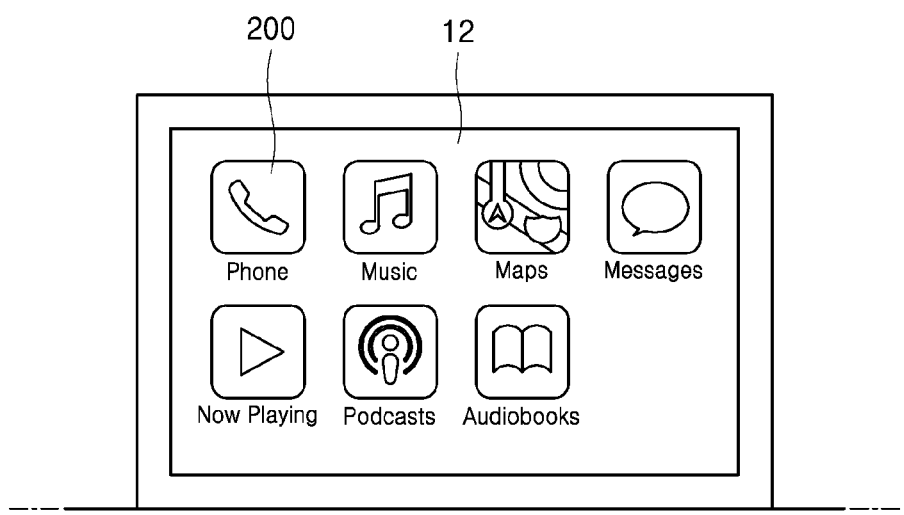
FIG. 3 is a diagram illustrating a plurality of GUIs displayed at the display module.
Figure 4:
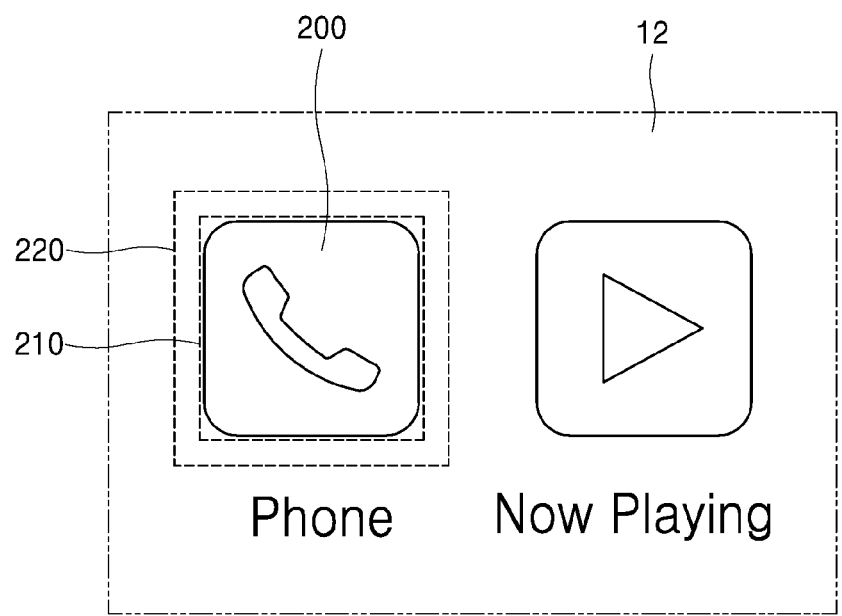
FIG. 4 is a diagram for describing a display area and a touch area of a GUI.
Figure 5:
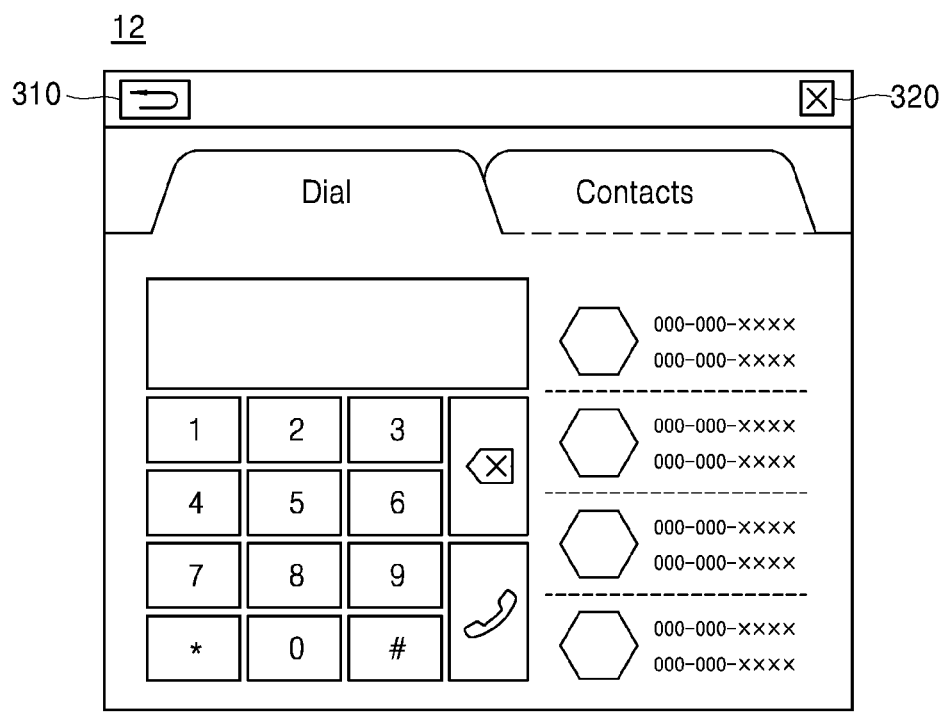
FIG. 5 is a diagram illustrating an example of a screen displayed at the display module when an application is executed.

FIG. 3 is a diagram illustrating a plurality of GUIs displayed at the display module, and FIG. 4 is a diagram for describing a display area and a touch area of a GUI. FIG. 5 is a diagram illustrating an example of a screen displayed at the display module when an application is executed.

Figure 6A:
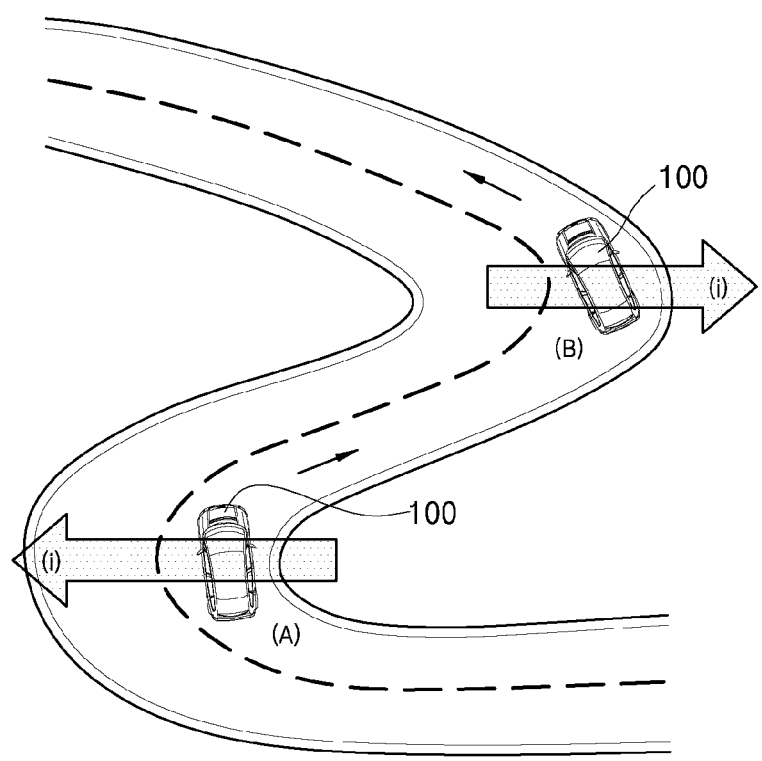
FIGS. 6A and 6B are diagrams for describing inertial forces acting on a driver based on a motion of the vehicle.
Figure 6B:
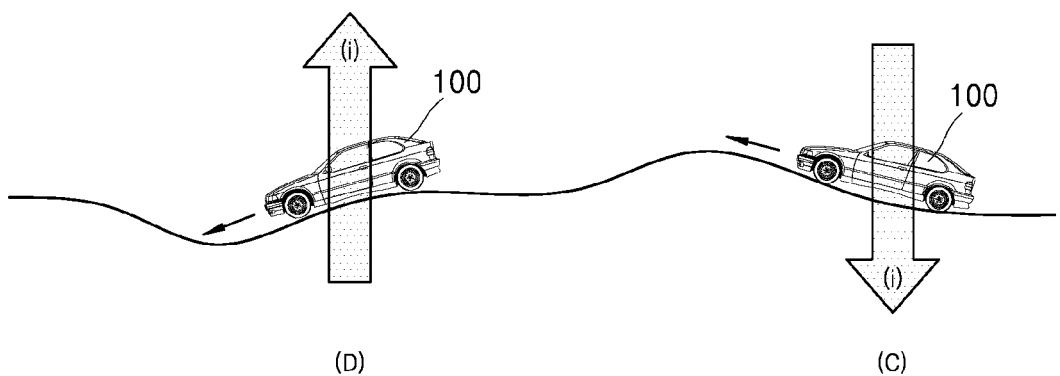
Figure 7:
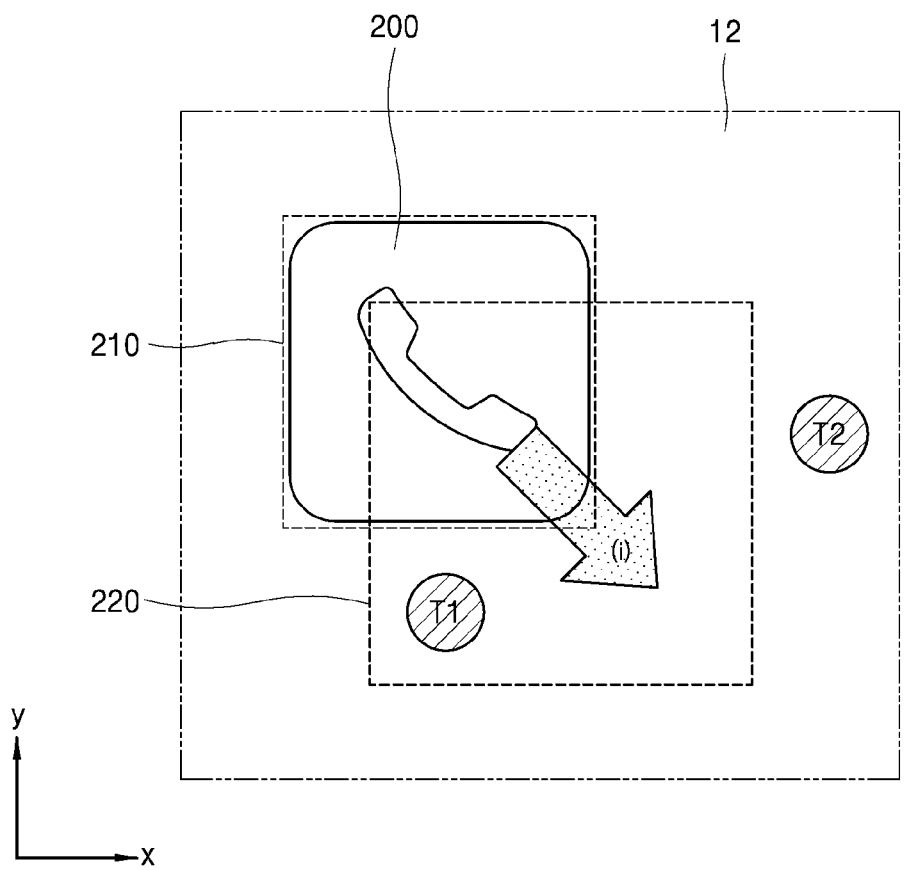
FIG. 7 is a diagram illustrating a touch area of a GUI being changed according to a motion of the vehicle.

FIGS. 6A and 6B are diagrams for describing inertial forces acting on a driver based on a motion of the vehicle, and FIG. 7 is a diagram illustrating a touch area of a GUI being changed according to a motion of the vehicle.

Figure 8A:
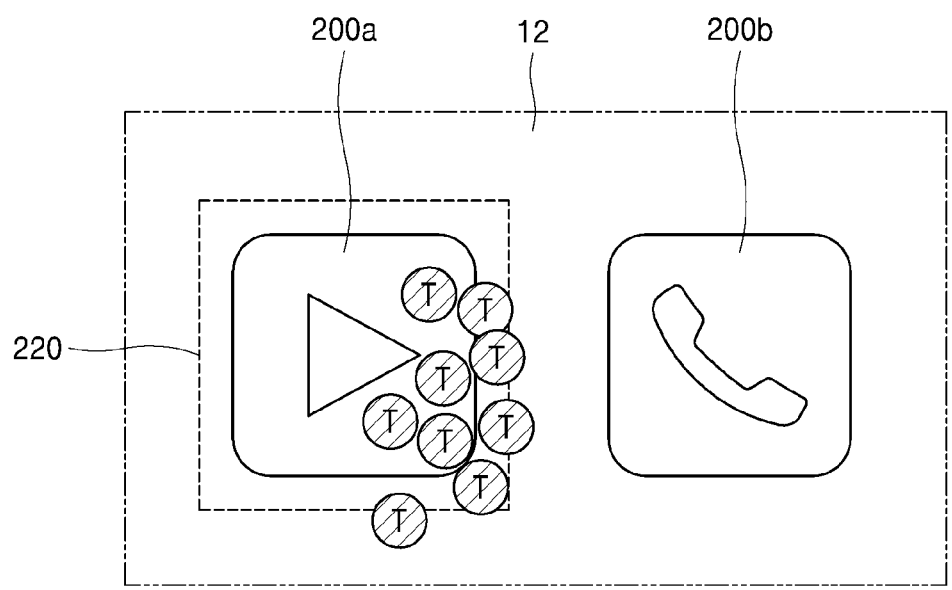
FIGS. 8A and 8B are diagrams for describing a process of changing a touch area of a GUI based on a user's touch habit on the GUI.
Figure 8B:
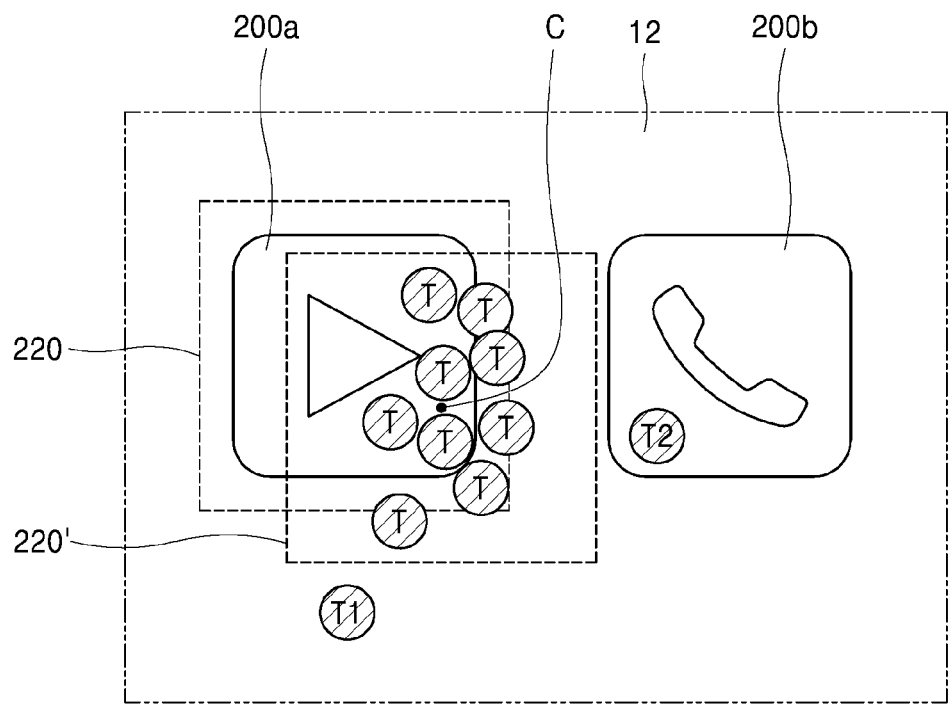

FIGS. 8A and 8B are diagrams for describing a process of changing a touch area of a GUI based on a user's touch habit on the GUI.

Figure 9:
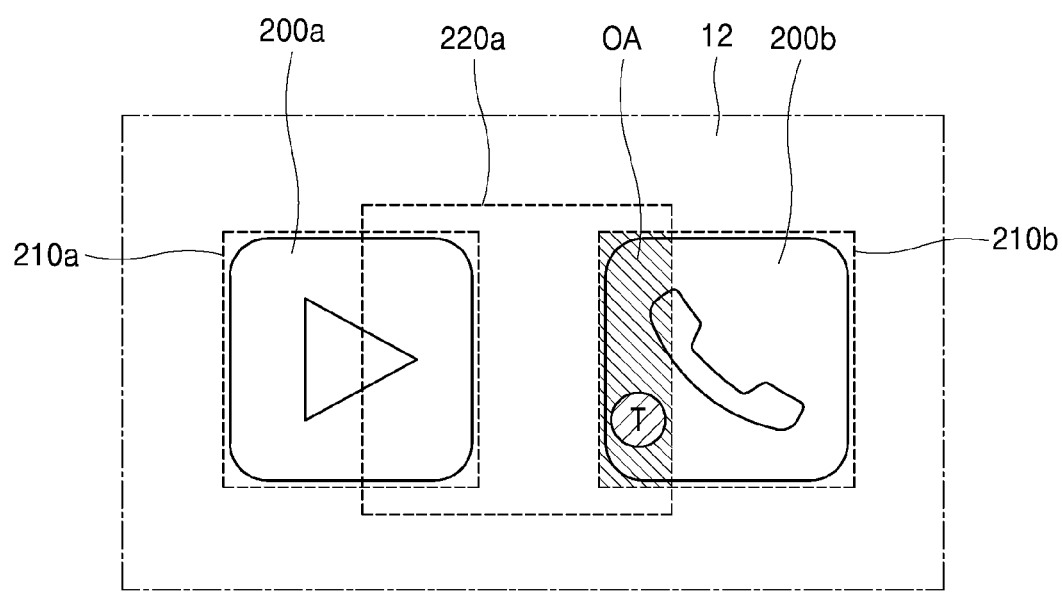
FIG. 9 is a diagram illustrating a touch is being inputted at an overlap area between a touch area of a particular GUI and a display area of an adjacent GUI.
Figure 10:
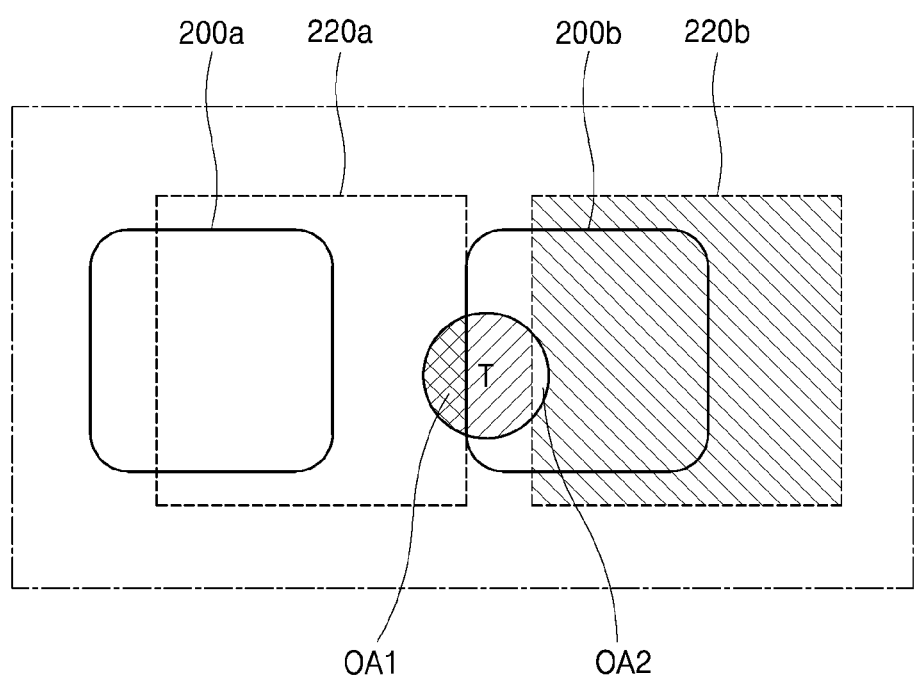
FIG. 10 is a diagram illustrating a touch being inputted at an overlap area between a touch area of a particular GUI and a touch area of an adjacent GUI.

FIG. 9 is a diagram illustrating a touch being inputted at an overlap area between a touch area of a particular GUI and a display area of an adjacent GUI. FIG. 10 is a diagram illustrating a touch being inputted at an overlap area between a touch area of a particular GUI and a touch area of an adjacent GUI.

Figure 11:
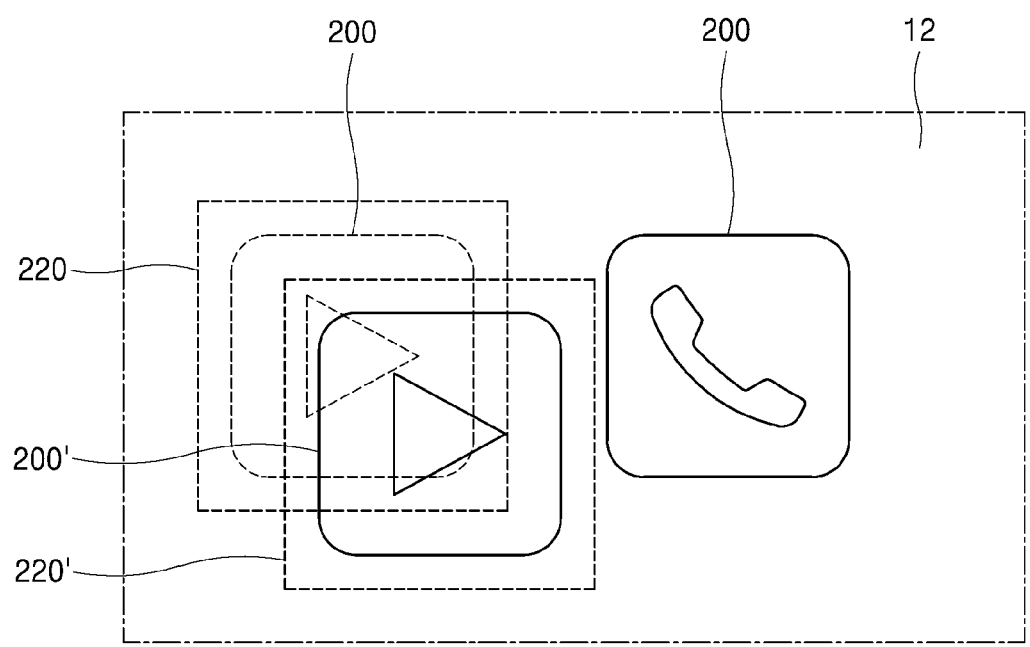
FIG. 11 is a diagram illustrating a display area being changed according to a change in a touch area.

FIG. 11 is a diagram illustrating a display area being changed according to a change in a touch area.

Referring to FIG. 1, a vehicle 100 according to at least one embodiment of the present disclosure may include a display device 1 and an internal device 40.

The vehicle 100 to which embodiments of the present disclosure may be applied may be implemented as an internal combustion engine vehicle having an engine as a power source, a hybrid vehicle having an engine and electric motor as a power source, an electric vehicle having an electric motor as a power source, or a fuel cell electric vehicle having a fuel cell as a power source.

The vehicle 100 to which embodiments of the present disclosure may be applied may be an autonomous vehicle which can autonomously travel to a destination without operation (e.g., steering) by a user. In this situation, the autonomous vehicle may be connected to a random AI (Artificial Intelligence) module, a drone, an unmanned aerial vehicle, a robot, an AR (Augmented Reality) module, a VR (Virtual Reality) module, a 5G (5th Generation) mobile communication device and/or the like.

With continued reference to FIG. 1, according to at least one embodiment of the present disclosure, the display device 1 includes a display module 10, a processor 20 and a memory 30. The internal device 40 of the vehicle 100 may include an external camera 41, a radar (radio detection and ranging) 42, a lidar (light detection and ranging) 43, an internal camera 44, a pressure sensor 45 and an acceleration sensor 46. The display device 1 and the internal device 40 illustrated in FIG. 1 are based on at least one embodiment, and embodiments of the present disclosure are not limited thereto. For example, components thereof are not limited to components illustrated in FIG. 1. If necessary, some components may be added, changed or removed.

The components illustrated in FIG. 1 may be implemented as physical elements including one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), controllers, micro-controllers or microprocessors or combinations thereof.

FIG. 1 is a partial internal block diagram of the vehicle 100 for purposes of describing at least one embodiment of the present disclosure, and it is understood that the vehicle may further include a plurality of components required for driving, in addition to the components illustrated in FIG. 1.

In this disclosure, the term "user" may be used to refer to any (or all) persons in the vehicle 100 including a driver.

The display module 10 may be installed in the vehicle 100 to display a GUI 200 (see, e.g., FIG. 3).

The display module 10 may be installed at a random position (or location) within the vehicle 100, and embedded at a specific position when the vehicle 100 is manufactured.

Referring to FIG. 2, the display module 10 may include a main display 11 installed in the center of a dash board, a center display 12 installed at the center top of the dashboard, a cluster display 13 positioned at the rear of (or behind) a steering wheel 110 and installed on the dashboard at (the side of) a driver seat, and a passenger seat display 14 installed on the dashboard at (the side of) a passenger seat. Although not illustrated in the drawings, it is understood that the display module 10 may also include RSE (Rear Seat Entertainment) displays 15 installed on the respective rear surfaces of the driver seat and the passenger seat.

The display module 10 may receive a user touch through (or via) a screen, and accordingly provide various pieces of information to the user according to the user touch. To facilitate such operations, the display module 10 may display the GUI 200.

FIG. 3 is an example of a display at the center display 12 of FIG. 2. At least one embodiment will be described based on the GUI 200 being displayed at the center display 12. However, it is understood that the GUI 200 may be displayed at the display module 10 installed at a random position within the vehicle 100.

Referring to FIG. 3, the display module 10 may display a plurality of GUIs 200. Each of the GUIs 200 may include a graphic symbol capable of capturing the function of an application corresponding to the GUI 200. For example, the GUI 200 corresponding to a phone application may include a receiver-shaped graphic, and the GUI 200 corresponding to a music application may include a note-shaped graphic.

With reference to FIG. 4, the display module 10 may receive a user touch at a touch area 220 corresponding to a GUI 200, and the processor 20 may execute an application corresponding to the GUI 200 in response to the received user touch.

Referring to FIG. 4, the display module 10 may display a GUI 200 within a preset display area 210, and receive a user touch at a preset touch area 220. In general, the touch area 220 corresponding to any particular GUI 200 may be selected to be wider than the display area 210, in order to improve user convenience.

In order to execute a specific application, a user may input a touch onto the touch area 220 of the GUI 200 corresponding to the specific application. The display module 10 may sense the user touch through a touch sensor embedded therein, and generate a sensing signal and provide the generated sensing signal to the processor 20.

The processor 20 receiving the sensing signal may identify the specific application corresponding to the GUI 200 by referring to the memory 30, and execute the identified application. When the application is executed, the display module 10 may display a screen for facilitating operation of the application.

Referring to FIG. 4, the user may input a user touch onto the touch area 220 of the GUI 200 including the receiver-shaped graphic. Accordingly, the processor 20 may execute the phone application corresponding to the GUI 200.

When the phone application is executed, the display module 10 may display a screen including a dial and contacts information as illustrated in FIG. 5, and the user may input an additional user touch onto the screen to use the phone function.

Referring to FIG. 6A, when the vehicle 100 makes a right turn at a position A, an inertial force i to the left may occur (or act on one or more objects) in the vehicle 100. Furthermore, when the vehicle 100 makes a left turn at a position B, an inertial force to the right may occur (or act on one or more objects) in the vehicle 100. Therefore, when the vehicle 100 is at the position A, the driver may lean (or be pulled) to the left due to the inertial force. Furthermore, when the vehicle 100 is at the position B, the driver may lean (or be pulled) to the right due to the inertial force.

Referring to FIG. 6B, when the vehicle 100 travels on an uphill road at a position C, a downward inertial force may occur (or act on one or more objects) in the vehicle 100. Furthermore, when the vehicle 100 travels on a downhill road at a position D, an upward inertial force may occur (or act on one or more objects) in the vehicle 100. Therefore, when the vehicle 100 is at the position C, the driver may lean (or be pulled) downward due to the inertial force. Furthermore, when the vehicle 100 is at the position D, the driver may lean (or be pulled) upward due to the inertial force.

When the body of the user leans in response to the motion of the vehicle 100, the user may not be able to accurately input a user touch onto the earlier-described touch area 220.

According to at least one embodiment of the present disclosure, the processor 20 may change the touch area 220 corresponding to the GUI 200 according to a motion of the vehicle 100, thereby improving the likelihood that an accurate touch will be made by the user.

The processor 20 may collect map information to determine a motion of the vehicle 100. More specifically, the processor 20 may collect map information from a traffic information server. Alternatively, the map information may be stored in the memory 30 in advance, and the processor 20 may collect the map information from the memory 30. The map information may include the curvature, flatness and the like of a road. For example, the map information may be implemented as a high definition (HD) map.

The processor 20 may identify information regarding the road on which the vehicle 100 is traveling at the moment, based on the map information, and determine a motion of the vehicle 100 based on the identified road information and the velocity of the vehicle 100. More specifically, the processor 20 may determine the motion of the vehicle 100 based on the identified road information and the current velocity of the vehicle 100, and predict a future motion of the vehicle 100 based on the identified road information and an expected velocity of the vehicle 100.

The processor 20 may collect sensing information to determine a motion of the vehicle 100. More specifically, the processor 20 may collect sensing information through various sensors installed in the vehicle 100.

For example, the vehicle 100 may include the acceleration sensor 46. The acceleration sensor 46 may be fixedly installed in the vehicle 100 to measure acceleration by a motion of the vehicle 100. The acceleration sensor 46 may be implemented as any of various devices used in this technical field. For example, the acceleration sensor 46 may be implemented as a gyroscope.

The processor 20 may determine a motion of the vehicle 100 through (or based on) the acceleration value measured by the acceleration sensor 46. More specifically, since the earlier-described inertial force is generated by acceleration, the processor 20 may determine how much acceleration is generated in a certain direction within the vehicle 100, using the acceleration sensor 46, and determine an inertial force generated by the motion of the vehicle 100, based on the acceleration.

As another example, the vehicle 100 may include the external camera 41, the radar 42 and the lidar 43. The external camera 41 may collect information on the flatness, curvature and the like of the road around the vehicle 100 using a visible image, the radar 42 may collect such information through microwaves, and/or the lidar 43 may collect such information through near-infrared rays.

The processor 20 may determine a motion of the vehicle 100 based on the collected information and the velocity of the vehicle 100. More specifically, the processor 20 may determine the current motion of the vehicle 100 based on the collected information and the current velocity of the vehicle 100, and predict a future motion of the vehicle 100 based on the collected information and an expected velocity of the vehicle 100.

The processor 20 may change the touch area 220 corresponding to the GUI 200 according to the determined motion of the vehicle 100. In other words, the processor 20 may change the touch area 220 corresponding to the GUI 200 according to the magnitude and direction of an inertial force which is applied to (or acts on) the user in the vehicle 100 due to the motion of the vehicle 100.

More specifically, the processor 20 may identify a touch displacement corresponding to the motion of the vehicle 100 by referring to the memory 30, and change the touch area 220 based on the identified touch displacement. In this regard, touch displacements corresponding to respective random motions of the vehicle 100 may be stored in the memory 30 in advance. According to at least one embodiment of the present disclosure, the touch displacement may indicate a displacement between a changed touch area 220' and the touch area 220, and include a change direction and a distance change.

For example, the motion of the vehicle 100 may be determined based on an acceleration value measured by the acceleration sensor 46. In this situation, the processor 20 may identify a touch displacement corresponding to the acceleration value, and change the touch area 220 based on the identified touch displacement.

As another example, the motion of the vehicle 100 may be determined based on the map information. In this situation, the processor 20 may identify a touch displacement corresponding to the map information, and change the touch area 220 based on the identified touch displacement.

As another example, the motion of the vehicle 100 may be determined based on sensing information identified by the external camera 41, the radar 42, the lidar 43 and/or the like. In this situation, the processor 20 may identify a touch displacement corresponding to the sensing information, and change the touch area 220 based on the identified touch displacement.

Referring to FIG. 7, a predetermined magnitude of an inertial force i generated in a direction of an arrow illustrated in the figure (bottom right direction) may be applied to (or act on) the user in the vehicle 100 due to a specific motion of the vehicle 100. In this situation, the processor 20 may identify a touch displacement corresponding to the inertial force i by referring to the memory 30, and move the touch area 220 toward the bottom right by a predetermined distance based on the identified touch displacement.

Since the magnitude of an inertial force is proportional to the mass of an object, the inertial force applied to (or acting on) the user in the vehicle 100 may be proportional to the weight of the user. Therefore, the processor 20 may correct (or adjust) the touch displacement according to the user weight.

The pressure sensor 45 may be installed in a seat within the vehicle 100. The pressure sensor 45 may sense pressure applied to the seat, and determine the user's weight. The processor 20 may correct (or adjust) the touch displacement according to the user's weight as determined using the pressure sensor 45.

More specifically, the processor 20 may correct the touch displacement by multiplying the touch displacement by a correction value which is preset for a particular weight value. The correction value may be preset to a value proportional to the user's weight.

Therefore, with reference to FIG. 7, the touch area 220 may be moved along a constant direction, but the distance of the move may be larger as the weight of the user increases, and smaller as the weight of the user decreases.

The touch displacement stored in the memory 30 may be preset according to a reference weight (for example, 60 kg). The processor 20 may identify a touch displacement by referring to the memory 30, calculate the ratio of the user weight identified using the pressure sensor 45 to the reference weight, and then correct (or adjust) the touch displacement by multiplying the calculated ratio by the touch displacement.

For example, when the touch displacement identified by referring to the memory 30 is 1.5 cm in the bottom right direction and the ratio of the user's weight (80 kg) to the reference weight (60 kg) is 4/3, the processor 20 may determine a displacement of 2 cm, which is the product of 1.5 cm and 4/3, as the corrected touch displacement.

By way of example, FIG. 7 illustrates the touch area 220 being changed for a user having the reference weight of 60 kg. The touch area 220 may be moved 4/3 times further than the distance illustrated in FIG. 7, for a user having a weight of 80 kg.

As described with reference to at least one embodiment, the pressure sensor 45 installed in the seat within the vehicle 100 measures a weight of a user. In addition, it is understood that any of various other elements for measuring a user's weight can be applied in embodiments of the present disclosure.

After the touch area 220 is changed, the display module 10 may receive a user touch at the changed touch area 220.

With continued reference to FIG. 7, the display module 10 may receive a user touch T1 at the changed touch area 220, after the touch area 220 for the button of the GUI 200 is changed. Here, the processor 20 may execute an application corresponding to the GUI 200.

Alternatively, the display module 10 may receive a user touch at areas other than the changed touch area 220. Here, the processor 20 may update a touch displacement corresponding to a motion of the vehicle 100 based on a coordinate(s) of the received user touch.

For example, with reference to FIG. 7, the display module 10 may receive a user touch T2 at an area other than (or outside of) the changed touch area 220, after the touch area 220 for the GUI 200 is changed. Since the user touch T2 is received outside of the changed touch area 220, the processor 20 may not execute an application corresponding to the GUI 200.

Instead, the processor 20 may identify one or more coordinates of the user touch T2, and update the touch displacement based on the corresponding coordinate(s). More specifically, the processor 20 may identify that the user touch was inputted to the right of the changed touch area 220, based on the coordinate(s) of the user touch T2. Therefore, the processor 20 may update the touch displacement to further move the touch area 220 for the GUI 200 to the right.

For example, the processor 20 may identify a y-axis displacement between the y-axis coordinate of the center point of the changed touch area 220 and the y-axis coordinate of the user touch T2. Furthermore, the processor 20 may identify an x-axis displacement between the x-axis coordinate of the center point of the changed touch area 220 and the x-axis coordinate of the user touch T2.

The processor 20 may update the existing touch displacement by adding the x-axis displacement and the y-axis displacement to the touch displacement, and further change the changed touch area 220 based on the updated touch displacement. Therefore, the touch area may be moved upward according to the y-axis displacement and moved rightward according to the x-axis displacement, such that the coordinate(s) of the user touch T2 may be located within the further changed touch area 220.

The updating of the touch area 220 may be performed whenever a user touch is inputted onto an area other than (or outside of) the touch area 220, or performed when the number of times that user touches are inputted onto the area other than the touch area 220 is equal to or greater than a predetermined count.

As described earlier, the display device according to at least one embodiment of the present disclosure may change the touch area 220 of the GUI 200 according to a motion of the vehicle 100, and execute an application corresponding to what the user intended even in a random driving environment.

Furthermore, the processor 20 may change the touch area 220 based on touch habit information of a user, together with or separately from the changing of the touch area 220 according to a motion of the vehicle 100.

More specifically, the processor 20 may identify touch habit information corresponding to the GUI 200 by referring to the memory 30, and change the touch area 220 corresponding to the GUI 200 according to the identified touch habit information.

Referring to FIG. 8A, the user may usually input user touches T for a first GUI 200a at the bottom right of the touch area 220 by habit. The respective coordinates of the user touches T may be stored in the memory 30. The processor 20 may identify touch habit information corresponding to the first GUI 200a based on the respective coordinates of the user touches T stored in the memory 30.

The touch habit information may be information indicating the tendency of a user touch to occur at a particular location based on the positions of a plurality of user touches T for a specific GUI 200. The processor 20 may identify the touch habit information based on the plurality of user touches T illustrated in FIG. 8A, and move the touch area 220 to the bottom right according to the identified touch habit information.

Referring to FIG. 8B, the touch habit information may indicate the average coordinates of the plurality of user touches T. The processor 20 may calculate the average coordinates of the user touches T stored in the memory 30, and change the touch area 220 such that the coordinate(s) of the center C of the changed touch area 220' becomes (or corresponds to) the average coordinate(s) of the user touches T that were illustrated in FIG. 8A. In other words, the coordinates of the center C of the changed touch area 220' in FIG. 8B may be (approximately equal to) the average coordinates of the plurality of user touches T illustrated in FIG. 8A.

After the touch area 220 is changed according to the touch habit information, the display module 10 may receive a user touch at an area other than (or outside of) the changed touch area 220'. In this situation, the processor may update the touch habit information based on the coordinate of the received user touch.

For example, in FIG. 8B, the display module 10 may receive a user touch T1 through an area outside of the changed touch area 220', after the touch area 220 for the first GUI 200a is changed. Since the user touch T1 is positioned outside of the touch area 220', the processor 20 may not execute an application corresponding to the first GUI 200a.

Instead, the processor 20 may identify the coordinate(s) of the user touch T1, and update the touch habit information based on the corresponding coordinate(s). More specifically, the processor 20 may identify that the user touch was inputted at an area under the touch area 220', based on the coordinate(s) of the user touch T1. Therefore, the processor 20 may update the touch habit information to move the touch area 220' for the first GUI 200a toward the bottom.

For example, when the touch habit information includes the average coordinate(s) of a plurality of user touches, the processor 20 may recalculate the average coordinate(s) of the user touches based on the user touches illustrated in FIG. 8A and the user touch T1 illustrated in FIG. 8B, and change the updated touch area 220' such that the coordinate(s) of the center C of the updated touch area 220' becomes (or corresponds to) the average coordinates of the plurality of user touches including the user touch T1.

As described above, the display device according to at least one embodiment of the present disclosure may change the touch area 220 of the GUI 200 according to a user's touch habit, to reflect a driving environment(s) and user characteristics in order to execute an application coinciding with what the user intended in performing a touch operation.

The updating of the touch habit information may be performed when the operation of changing the touch area 220 according to a motion of the vehicle 100 is not performed (e.g., when movement of the vehicle 100 does not significantly shift). In other words, the updating of the touch habit information may not be performed when the touch area 220 is changed according to a motion of the vehicle 100, but rather may be performed only when the touch area 220 is not changed according to a motion of the vehicle 100.

In this regard, the processor 20 may determine a value of an inertia parameter according to a motion of the vehicle 100, and update the touch habit information when the determined value of the inertia parameter is less than a reference value.

The inertia parameter may be a random parameter capable of numerically expressing a motion of the vehicle 100. For example, the inertia parameter may be identified based on the earlier-described map information, or indicate the curvature, flatness and the like of a road, identified through the external camera 41, the radar 42 and/or the lidar 43, or an acceleration value measured by the acceleration sensor 46.

When an inertial force generated in the vehicle 100 has a small magnitude, a user touch inputted to the display module 10 may be controlled more precisely by the user. Therefore, the operation of changing the touch area 220 according to a motion of the vehicle 100 may be performed when the value of the inertia parameter is equal to or greater than the reference value.

Alternatively, the operation of changing the touch area 220 according to the touch habit information may be performed regardless of whether the value of the inertia parameter is equal to or greater than the reference value or less than the reference value. When the value of the inertia parameter is equal to or greater than the reference value, it may be difficult to recognize whether a user touch input outside of the touch area 220 is caused by a motion of the vehicle 100 or the habit of the user. Therefore, according to at least one embodiment, the operation of updating the touch habit information may be performed only when the inertia parameter is less than the reference value.

When a user touch is inputted outside of the touch area 220, an application different from what the user intended may be executed. Here, the user may cancel the execution of the application, and, according to an embodiment of the present disclosure, the display device may further perform an operation of updating the touch area 220 in consideration of a trial and error of the user.

In this regard, the display module 10 may receive a first user touch for executing an application through the touch area 220, and then receive a second user touch for canceling the execution of the application within a preset time. Here, the processor 20 may update the touch area 220 based on the coordinate of the first user touch.

Such an update operation will be described in more detail with reference to FIGS. 5 and 8B.

Referring to FIG. 8B, the display module 10 may receive a first user touch T2 for executing the phone application at a touch area (not illustrated) corresponding to the second GUI 200b. Thus, the processor 20 may execute the phone application corresponding to the second GUI 200b, and the display module 10 may display the interface as illustrated in FIG. 5.

Then, within a preset time (for example, 3 seconds), the display module 10 may receive a second user touch for canceling the execution of the phone application.

More specifically, as illustrated in FIG. 5, the interface displayed by (or due to) the execution of the phone application may include a back button 310 and a close button 320 as buttons for canceling the execution of the phone application. The display module 10 may receive the second user touch for canceling execution of the phone application through any one button of the two buttons 310 and 320.

That is, when the phone application corresponding to the second GUI 200b is inadvertently executed when the first user touch T2 was actually an input for executing a video playing application corresponding to the first GUI 200a, the user may cancel the execution of the phone application through (or by performing) the additional second user touch.

Furthermore, it is understood that an operation of changing the touch area 220 for the GUI 200 at which the second user touch is inputted (for example, the back button 310 and the close button 320 illustrated in FIG. 5) can also be performed.

Here, the processor 20 may update the touch area 220' based on the coordinate(s) of the first user touch T2. The updating of the touch area 220' may be performed by updating the touch displacement corresponding to a motion of the vehicle 100 or updating the touch habit information as described earlier.

As the touch area 220' is updated, the touch area 220' of FIG. 8B may be further moved to the right.

As described with reference to at least one embodiment, the display device may update the touch area 220 of the GUI 200 in consideration of a trial and error in a user touch, and thus reflect user characteristics which may be changed as the period of use increases and user behavior changes, in order to execute an application coinciding with what the user intended in performing a touch operation.

An operation of changing the touch area 220 when the plurality of GUIs 200 are displayed on the display module 10 will now be described in more detail.

The display module 10 may display the plurality of GUIs 200. Here, the processor 20 may perform the earlier-described touch area changing operation on each of the GUIs 200. Alternatively, the processor 20 may identify a target GUI among the plurality of GUIs 200 based on a user operation, and selectively change only the touch area 220 corresponding to the target GUI.

In other words, the processor 20 may determine the target GUI which the user intends to touch, based on the user operation, and change the touch area 220 for only the target GUI.

Here, the processor 20 may identify a user operation.

For example, the processor 20 may identify the target GUI based on a user operation captured using the internal camera 44 installed in the vehicle 100.

The vehicle 100 may include the internal camera 44 for capturing an image of the user therein. The processor 20 may analyze the image captured by the internal camera 44, identify, as an object, a body part of the user who attempts a touch, and identify the GUI 200 close (e.g., closest) to the identified object as the target GUI.

In order to identify, as an object, a body part of the user, the processor 20 may perform an object detection operation through a technique such as frame differencing, optical flow or background subtraction, and perform an object classification operation through a technique such as shaped-based classification, motion-based classification, color-based classification or texture-based classification.

Furthermore, in order to track a body part of the user, the processor 20 may perform an object tracking operation through a technique such as point tracking, kernel tracking or silhouette.

In addition, the method for identifying a body part of the user and tracking the identified body part may be based on any of various methods used in this technical field.

As another example, the processor 20 may identify the target GUI based on a hover touch inputted through (or via) the display module 10.

The display module 10 may include a hover touch panel capable of sensing a touch without requiring a direct contact with the panel. The display module 10 may identify the target GUI by comparing the coordinate(s) of a hover touch sensed through (or via) the hover touch panel to the coordinate(s) of the display area 210 of each of the GUIs 200.

More specifically, the display module 10 may determine in which display area 210 the coordinate(s) of the hover touch is included, and identify a specific GUI 200 having the display area 210 including the coordinate(s) of the hover touch as the target GUI.

When the target GUI is identified, the processor 20 may perform the above-described touch area changing operation only on the target GUI.

The display module 10 may display the first GUI 200*a* and the second GUI 200*b* which are arranged adjacent to each other, and the processor 20 may change a touch area 220*a* corresponding to the first GUI 200*a* such that the changed touch area 220*a* overlaps a display area 210*b* of the second GUI 200*b*.

Referring to FIG. 9, the display module 10 may display the first and second GUIs 200*a* and 200*b* disposed adjacent to each other in the side-to-side direction. The processor 20 may change the touch area 220*a* for the first GUI 200*a*. Here, the changed touch area 220*a* may partially overlap the display area 210*b* of the second GUI 200*b*.

In other words, the touch area 220*a* corresponding to the first GUI 200*a* and the display area 210*b* of the second GUI 200*b* may overlap each other. The area of overlap will be referred to as an overlap area OA.

As illustrated in FIG. 9, the display module 10 may receive a user touch T at the overlap area OA. In this situation, the processor 20 may execute an application corresponding to the first GUI 200*a*.

More specifically, when a user touch is inputted at the changed touch area 220*a* for the first GUI 200*a*, the processor 20 may execute an application corresponding to the first GUI 200*a* regardless of the position coordinate(s) of the user touch.

For example, the processor 20 may change both of the touch areas corresponding to the first and second GUIs 200*a* and 200*b*. Therefore, the touch area 220*a* for the first GUI 200*a* may partially overlap the display area 210*b* of the second GUI 200*b*, but not overlap the touch area (not illustrated) for the second GUI 200*b*.

Here, when a user touch is inputted at the overlap area OA, the processor 20 may identify that the user touch is included in the touch area for the first GUI 200*a*, and execute an application corresponding to the first GUI 200*a*.

As another example, the processor 20 may identify the first GUI 200*a* as the target GUI, and change only the touch area 220*a* for the first GUI 200*a*. Therefore, the touch area 220*a* for the first GUI 200*a* may overlap not only the display area 210*b* of the second GUI 200*b*, but also the touch area for the second GUI 200*b*.

Here, when a user touch is inputted onto the overlap area OA, the processor 20 may identify that the user touch is included in both of the touch areas for the first and second GUIs 200*a* and 200*b*.

When the user touch is included in the touch areas for two or more GUIs 200, the processor 20 may execute an application corresponding to the target GUI. In other words, the processor 20 may execute an application corresponding to the first GUI 200*a* that was decided as the target GUI from amongst the first and second GUIs 200*a* and 200*b*.

The display module 10 may receive a user touch which overlaps the touch area 220*a* corresponding to the first GUI 200*a* and a touch area corresponding to the second GUI 200*b*. Here, the processor 20 may execute an application corresponding to a particular GUI having a wider touch area overlapped by the user touch, from amongst the first and second GUIs 200*a* and 200*b*.

Referring to FIG. 10, the touch area 220a corresponding to the first GUI 200a and the touch area 220b corresponding to the second GUI 200b may be changed. Here, the user may input a user touch which overlaps the touch area 220a corresponding to the first GUI 200a and the touch area 220b corresponding to the second GUI 200b.

The processor 20 may identify a first overlap area OA1 between the touch area 220a corresponding to the first GUI 200a and the user touch, and identify a second overlap area OA2 between the touch area 220b corresponding to the second GUI 200b and the user touch. Then, the processor 20 may compare the areas of the first and second overlap areas OA1 and OA2, and identify that the first overlap area OA1 is wider than the second overlap area OA2.

Therefore, the processor 20 may selectively execute an application corresponding to the first GUI 200a having the touch area 220a which includes the first overlap area OA1.

The processor 20 may change the display area 210 of the GUI 200 according to the changed touch area 220.

Referring to FIG. 11, the processor 20 may change the touch area 220 corresponding to the GUI 200 as described earlier. In this regard, the processor 20 may also change the display area 210 of the GUI 200 according to the changed touch area 220'.

For example, in the example illustrated in FIG. 4, the touch area 220 is not changed, and the center points of the display area 210 and the touch area 220 may have the same coordinate(s). However, when the touch area 220 is changed (e.g., as illustrated in FIG. 7), the coordinate(s) of the center point of the touch area 220 may be changed.

The processor 20 may change the display area 210 such that the center point of the display area 210 coincides with the center point of the changed touch area 220, and the display module 10 may display the GUI 200 based on the changed display area 210.

The touch area changing and updating by the processor 20, as described earlier with reference to various embodiments, may be performed through (or using) AI-based machine learning.

For example, the processor 20 may be trained to learn the coordinates of user touches using a random machine learning algorithm, and change and update the touch area 220 according to the learning result.

As another example, the processor 20 may perform the touch area changing and updating in connection with a machine learning server (not illustrated). As described earlier, the processor 20 may perform the touch area changing and updating by referring to the memory 30, and data stored in the memory 30 may be updated by the machine learning server. To facilitate a connection operation with the machine learning server, the vehicle 100 may further include a communication module (not illustrated).

The machine learning server may perform machine learning using an ANN (Artificial Neural Network) model. The ANN may indicate overall models, each of which is constituted by artificial neurons (nodes) forming a network through synapse coupling and has a problem solving ability. The ANN may be defined by a learning process of updating a connection pattern and model parameter between neurons in different layers and an activation function of generating an output value.

The ANN may include an input layer and an output layer, and selectively include one or more hidden layers. Each of the layers may include one or more neurons, and the ANN may include synapses each connecting a neuron and another neuron. In the ANN, each of the neurons may output a value of the activation function for a bias, weight and input signals inputted through a synapse.

In the machine learning through the ANN, the model parameter may indicate a parameter to be determined through learning, and a hyper parameter may indicate a parameter to be set before learning in the machine learning algorithm.

A communication unit may transmit hyper parameters collected and identified by the processor 20 to the machine learning server. The hyper parameters may include the earlier-described sensing information, the coordinates of user touches, the inertia parameters and/or the like. The machine learning server may determine a value of a model parameter by performing machine learning using the ANN model, and transmit the determined value of the model parameter to the vehicle 100.

The model parameter may be a parameter stored in the memory 30. For example, as described earlier, a touch displacement corresponding to a motion of the vehicle 100 may be stored in the memory 300 in advance. Here, the motion of the vehicle may be defined by the above-described hyper parameter, and the touch displacement may be determined using the model parameter.

When the model parameter is received from the machine learning server, the processor 20 may update the memory 30 based on the model parameter. Therefore, according to at least one embodiment of the present disclosure, the memory may be continuously updated by the AI-based machine learning, and the processor 20 may perform the touch area changing and updating by referring to the memory 30 which is continuously updated.

Regarding the connection operation with the machine learning server, according to at least one embodiment of the present disclosure, the vehicle 100 may perform data communication on a 5G network. Hereafter, a data communication method using a 5G network according to embodiments of the present disclosure will be described in more detail with reference to FIGS. 12 to 17.

Figure 12:
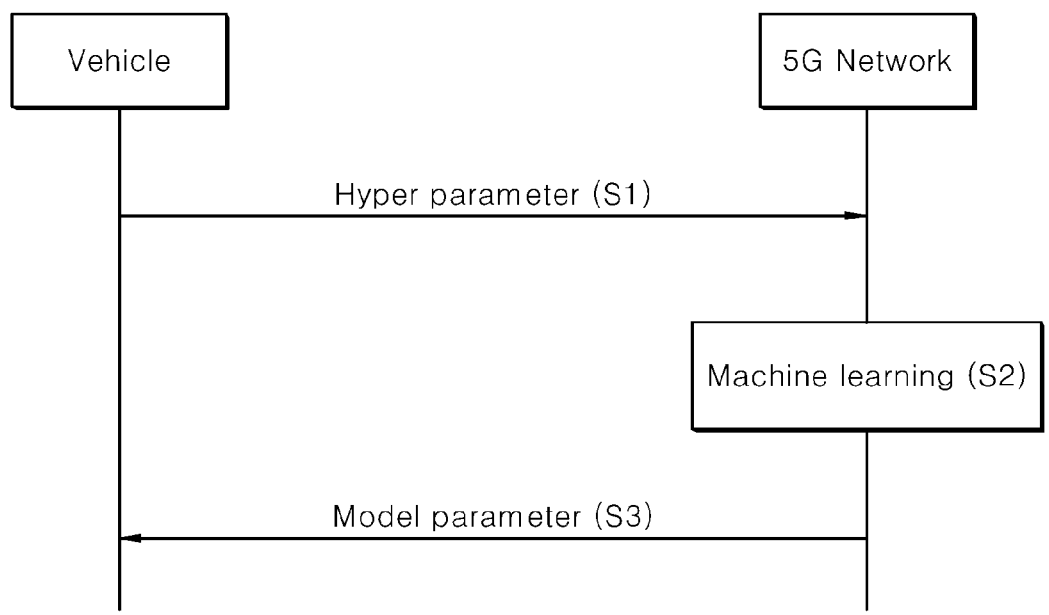
FIG. 12 is a diagram illustrating an example of a basic operation between a vehicle and a 5G network in a 5G communication system according to at least one embodiment.

FIG. 12 is a diagram illustrating an example of a basic operation between a vehicle and a 5G network in a 5G communication system according to at least one embodiment.

The vehicle may transmit hyper parameters to the 5G network at S1.

The hyper parameters may be parameters collected and identified by the vehicle, and include the earlier-described sensing information, the coordinates of user touches, and the inertia parameters.

Then, at S2, the 5G network may perform machine learning to determine a value of a model parameter based on the hyper parameters.

The 5G network may be connected to a machine learning server, or indicate (or include) the earlier-described machine learning server itself. Therefore, the 5G network may transmit the value of the model parameter, as the machine learning result based on the hyper parameters, to the machine learning server at S3.

Hereafter, referring to FIGS. 13 to 17, methods for conducting 5G communication between the vehicle and the 5G network (for example, an initial access between the vehicle and the 5G network) will be described in more detail with respect to embodiments of the present disclosure.

Figure 13:
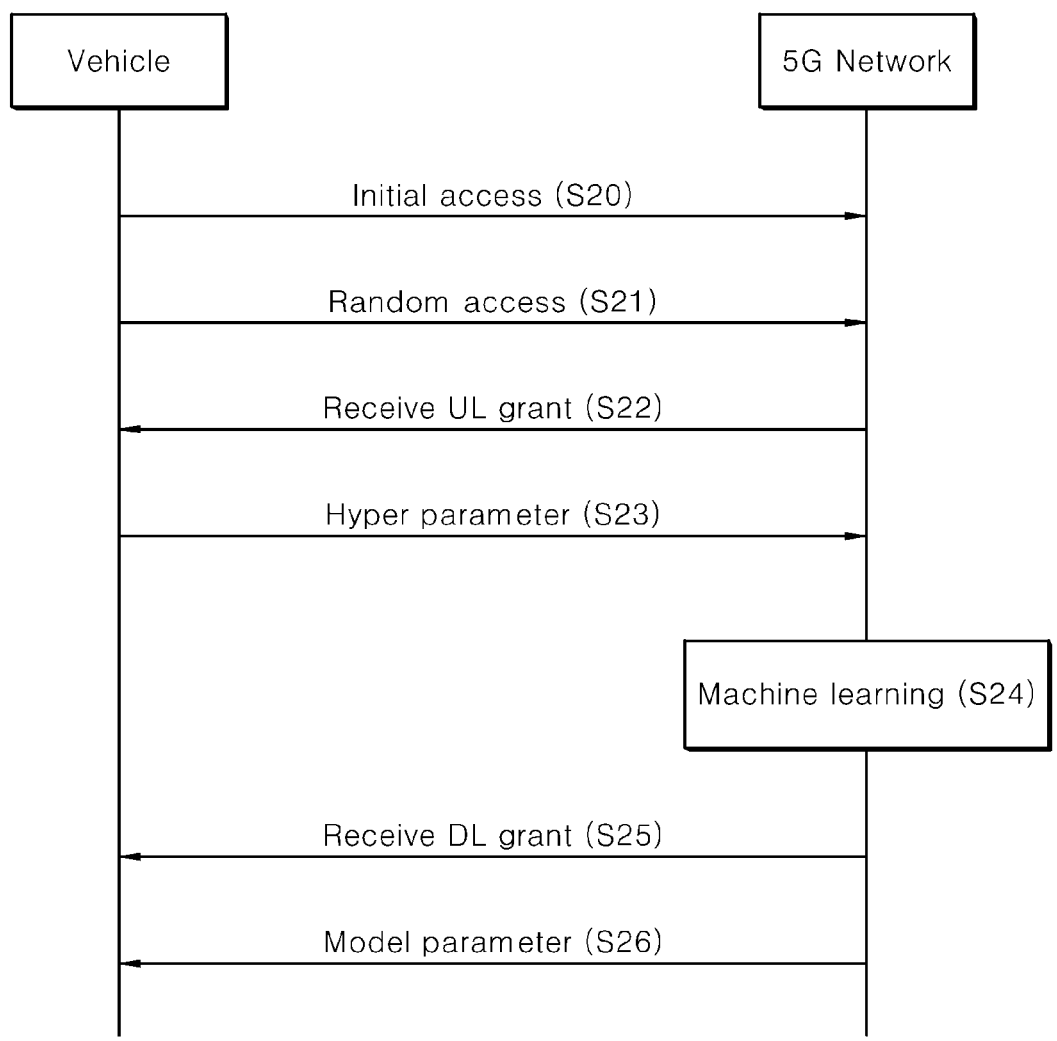
FIG. 13 is a diagram illustrating an example of an application operation between the vehicle and the 5G network in the 5G communication system according to at least one embodiment.

FIG. 13 is a diagram illustrating an example of an application operation between the vehicle and the 5G network in the 5G communication system according to at least one embodiment.

The vehicle may perform initial access to the 5G network at S20.

The initial access may include a cell search process of acquiring downlink (DL) synchronization, a process of acquiring system information, and/or the like.

Then, the vehicle may perform random access to the 5G network at S21.

The random access may include a process of acquiring uplink (UL) synchronization, a process of transmitting a preamble for UL data transmission, and/or a process of receiving a random access response.

The 5G network may transmit an UL grant for scheduling hyper parameter transmissions to the vehicle at S22.

A process of receiving the UL grant may include a process of scheduling time/frequency resources to transmit UL data to the 5G network.

The vehicle may transmit one or more values of the hyper parameters to the 5G network based on the UL grant at S23.

Then, at S24, the 5G network may perform a machine learning operation for determining a value of a model parameter based on the hyper parameters.

The vehicle may receive a DL grant through a physical downlink control channel to receive the value of the model parameter from the 5G network, at S25.

The 5G network may transmit the value of the model parameter to the vehicle based on the DL grant at S26.

In FIG. 13, an example in which the initial access process or the random access process between the vehicle and the 5G network and the DL grant receiving process are coupled has been described with reference to S20 to S26. However, it is understood that embodiments of the present disclosure are not limited thereto.

For example, the initial access process and/or the random access process may be performed through a process including S20, S22, S23, S24 and S26. Furthermore, the initial access process and/or the random access process may be performed through a process including S21, S22, S23, S24 and S26. Furthermore, a process in which an AI operation and the DL grant receiving process are coupled may be performed through a process including S23, S24, S25 and S26.

FIG. 13 illustrates the vehicle operation with reference to S20 to S26, but it is understood that embodiments of the present disclosure are not limited thereto.

For example, S20, S21, S22 and S25 may be selectively coupled to S23 and S26, in order to perform the vehicle operation. As another example, the vehicle operation may be constituted by S21, S22, S23 and S26. As another example, the vehicle operation may be constituted by S20, S21, S23 and S26. As another example, the vehicle operation may be constituted by S22, S23, S25 and S26.

FIGS. 14 to 17 are diagrams illustrating examples of the vehicle operation using 5G communication according to embodiments of the present disclosure.

Figure 14:
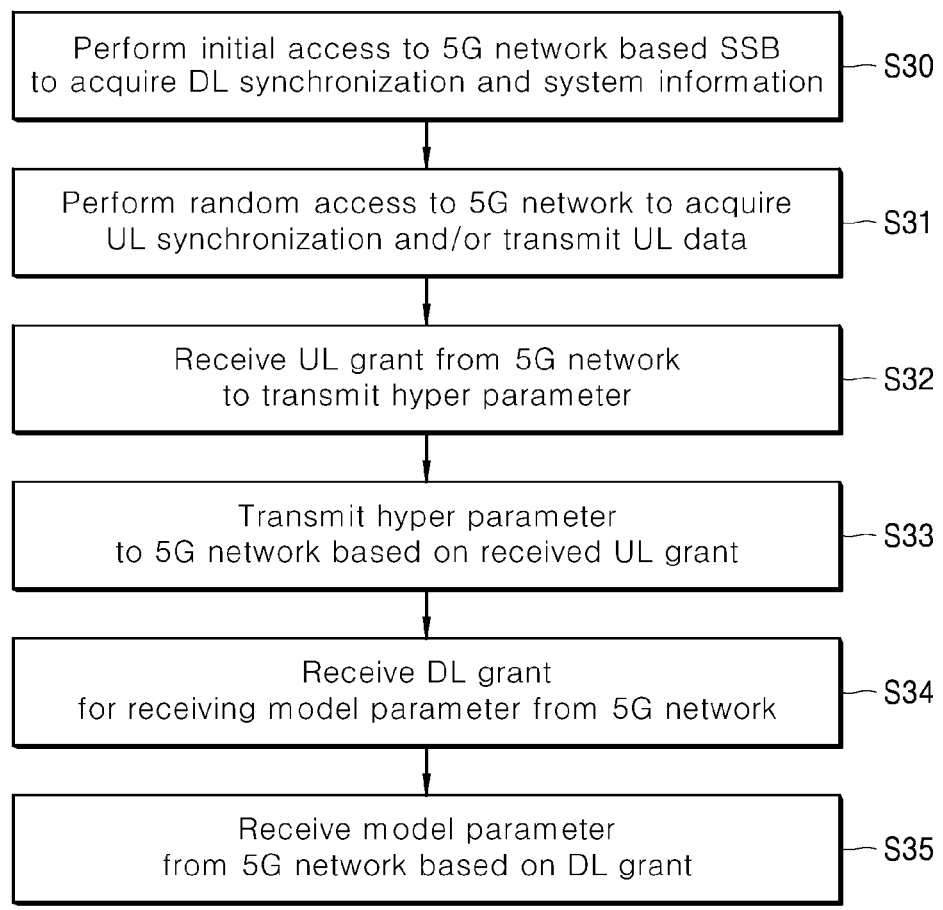
FIGS. 14 to 17 are diagrams illustrating examples of a vehicle operation using 5G communication according to embodiments of the present disclosure.

First, referring to FIG. 14, at S30, the vehicle may perform initial access to the 5G network based on an SSB (Synchronization Signal Block), in order to acquire DL synchronization and system information.

The vehicle may perform random access to the 5G network in order to acquire UL synchronization and/or transmit UL data, at S31.

The vehicle may receive an UL grant from the 5G network in order to transmit a hyper parameter at S32.

The vehicle may transmit the hyper parameter to the 5G network based on the UL grant at S33.

The vehicle may receive a DL grant for receiving a model parameter from the 5G network at S34.

The vehicle may receive the model parameter from the 5G network based on the DL grant at S35.

A beam management (BM) process may be added to S30, a beam failure recovery process related to PRACH (Physical Random Access Channel) transmission may be added to S31, a QCL (Quasi Co-Location) relationship may be added to S32 in relation to a beam receiving direction of a PDCCH (Physical Downlink Control Channel) including an UL grant, and a QCL relationship may be added to S33 in relation to a beam transmitting direction of a PUCCH (Physical Uplink Control Channel)/PUSCH (Physical Uplink Shared Channel) including a hyper parameter. Furthermore, a QCL relationship may be added to S34 in relation to the beam receiving direction of the PDCCH including a DL grant.

Figure 15:
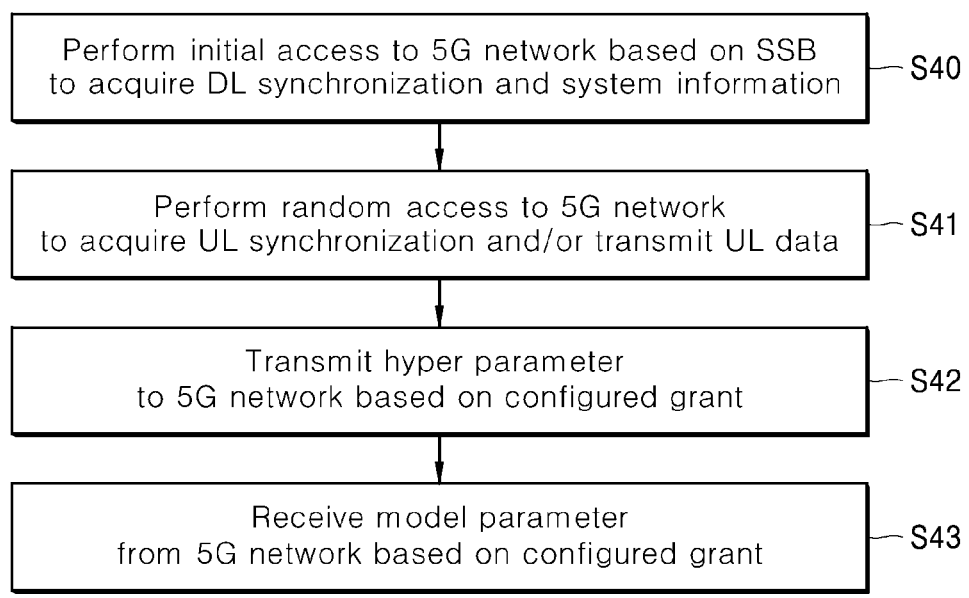

Referring to FIG. 15, the vehicle may perform initial access to the 5G network based on the SSB in order to acquire DL synchronization and system information, at S40.

The vehicle may perform random access to the 5G network in order to acquire UL synchronization and/or transmit UL data, at S41.

The vehicle may transmit a hyper parameter to the 5G network based on a configured grant at S42. For example, instead of the process of receiving an UL grant from the 5G network, the vehicle may transmit the hyper parameter to the 5G network based on the configured grant.

The vehicle may receive a model parameter from the 5G network based on the configured grant at S43.

Figure 16:
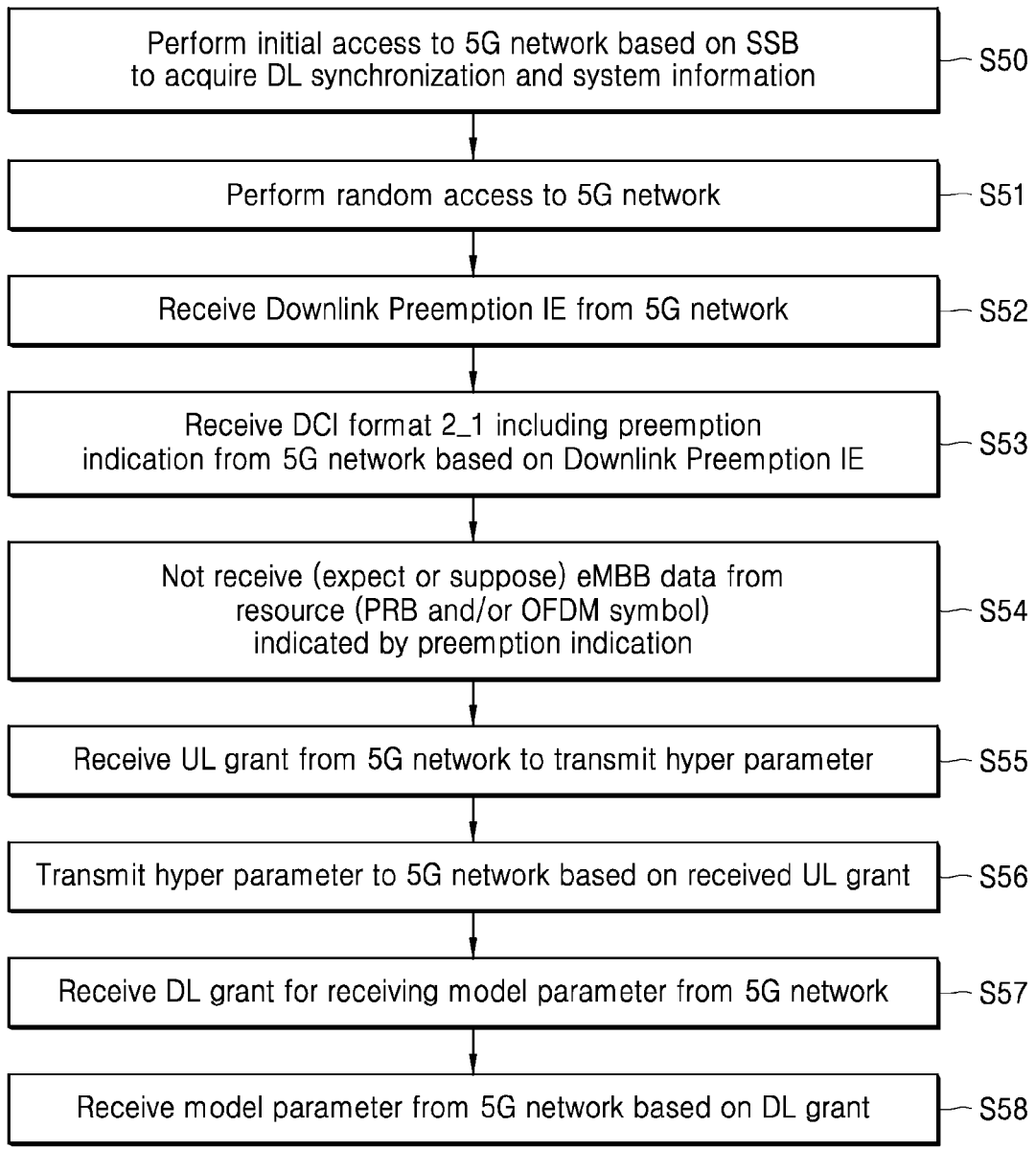

Referring to FIG. 16, the vehicle may perform initial access to the 5G network based on the SSB in order to acquire DL synchronization and system information, at S50.

The vehicle may perform random access to the 5G network in order to acquire UL synchronization and/or transmit UL data, at S51.

The vehicle may receive downlink preemption IE (information element) from the 5G network at S52.

The vehicle may receive, from the 5G network, a DCI (downlink control information) format 2_1 including preemption indication based on the downlink preemption IE, at S53.

The vehicle may not receive (e.g., expect or assume) eMBB (enhanced Mobile Broadband) data from a resource (PRB (physical resource block) and/or OFDM (orthogonal frequency division multiplexing) symbol) indicated by the preemption indication, at S54.

The vehicle may receive an UL grant from the 5G network in order to transmit a hyper parameter at S55.

The vehicle may transmit the hyper parameter to the 5G network based on the UL grant at S56.

The vehicle may receive a DL grant for receiving a model parameter from the 5G network at S57.

The vehicle may receive the model parameter from the 5G network based on the DL grant at S58.

Figure 17:
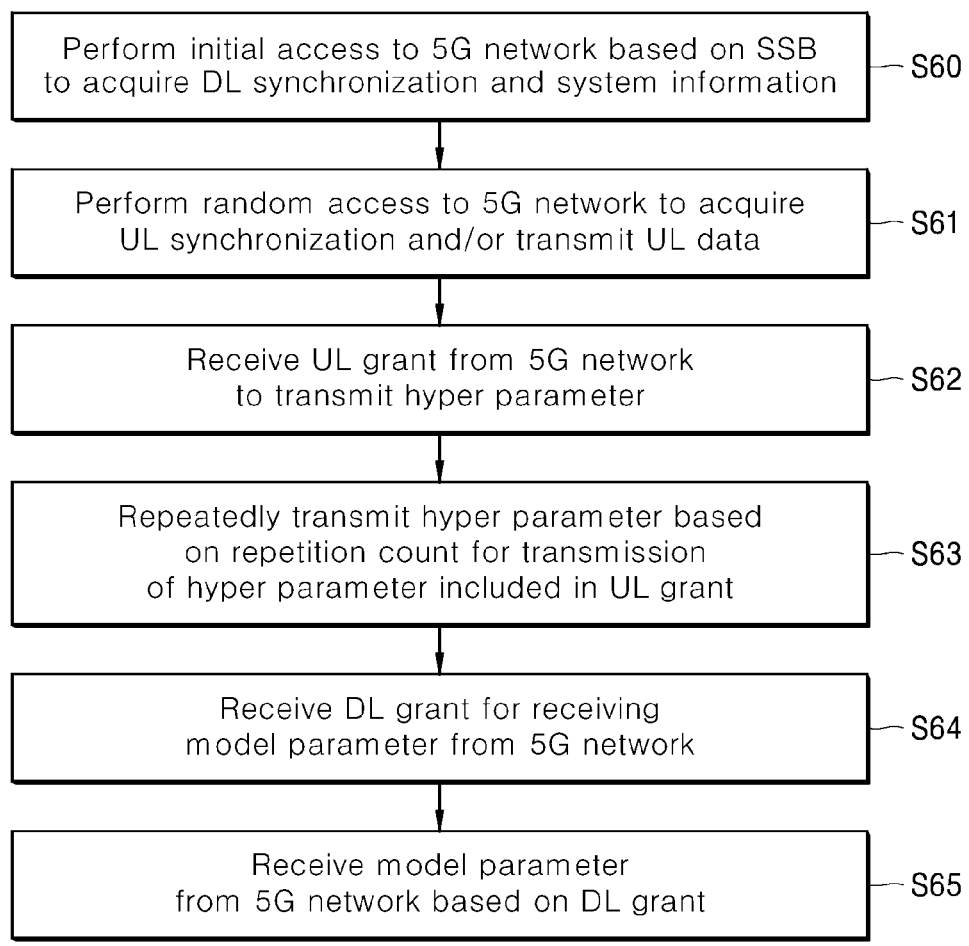

Referring to FIG. 17, the vehicle may perform initial access to the 5G network based on the SSB in order to acquire DL synchronization and system information, at S60.

The vehicle may perform random access to the 5G network in order to acquire UL synchronization and/or transmit UL data, at S61.

The vehicle may receive an UL grant from the 5G network in order to transmit hyper parameters at S62.

The UL grant may include information on the number of times that hyper parameter transmission is repeated, and the hyper parameters may be repeatedly transmitted based on the information on the repetition count, at S63.

The vehicle may transmit the hyper parameters to the 5G network based on the UL grant.

The repeated transmission of the hyper parameters may be performed by using frequency hopping, a first hyper parameter may be transmitted at a first frequency resource, and a second hyper parameter may be transmitted at a second frequency resource.

The hyper parameters may be transmitted through (or using) a narrowband of 6RB (Resource Block) or 1RB.

The vehicle may receive a DL grant for receiving a model parameter from the 5G network at S64.

The vehicle may receive the model parameter from the 5G network based on the DL grant at S65.

The earlier-described 5G communication technology may be supplemented to embody or clarify the data communication method of the vehicle, which has been described with reference to various embodiments. However, the data communication method of the vehicle is not limited thereto, and the vehicle may perform data communication through any of various methods used in this technical field.

In accordance with embodiments of the present disclosure, the display device can change a touch area of a GUI according to a motion of the vehicle, thereby improving the likelihood of executing an application coinciding with what a user intended in performing a touch operation even in a random driving environment.

Furthermore, the display device can change a touch area of a GUI according to a user's touch habit, and thus reflect not only a driving environment but also user characteristics, in order to execute an application better coinciding with what the user intended.

Furthermore, the display device can update a touch area of a GUI in consideration of trial and error in a user touch, and thus reflect user characteristics which may be changed as the period of use increases and user behavior changes, in order to execute an application better coinciding with what the user intended.

While various embodiments have been described above, it will be understood by those skilled in the art that the embodiments described herein are by way of example only. Accordingly, the disclosure described herein should not be limited based on the described embodiments.

What is claimed is:

1. A display device for a vehicle, the display device comprising:
    a display; and
    a processor configured to:
    display at least one GUI (graphical user interface) on the display of the display device;
    identify a motion of the vehicle; and
    based on the motion of the vehicle, control the display to transfer a first area for identifying a user touch on a GUI of the displayed at least one GUI to a second area of the display.

2. The display device of claim 1, wherein the processor is further configured to execute an application corresponding to the GUI selected based on the user touch.

3. The display device of claim 1, wherein the processor is further configured to:
    acquire map information and sensing information; and
    identify the motion of the vehicle based at least partially on the acquired map information or the acquired sensing information,
    wherein the map information includes a curvature and a flatness of a road corresponding to the vehicle.

4. The display device of claim 1, wherein the processor is further configured to:
    acquire a touch displacement according to the motion of the vehicle from a memory of the display device; and
    control the display to transfer the first area to the second area based on the acquired touch displacement.

5. The display device of claim 4, wherein the processor is further configured to adjust the touch displacement according to a user weight identified by a pressure sensor installed in a seat within the vehicle.

6. The display device of claim 1, wherein the processor is further configured to:
    receive a user touch at an area outside of the second area in the display; and
    update a touch displacement corresponding to the motion of the vehicle based on a coordinate of the received user touch.

7. The display device of claim 1, wherein the processor is further configured to:
    identify touch habit information corresponding to the GUI from a memory of the display device; and
    control the display to transfer the first area corresponding to the GUI to the second area based on the identified touch habit information.

8. The display device of claim 7, wherein the processor is further configured to:
    receive a user touch at an area outside of the second area; and
    update the touch habit information based on a coordinate of the received user touch.

9. The display device of claim 7, wherein the processor is further configured to:
    acquire a value of an inertia parameter based on the motion of the vehicle; and
    update the touch habit information based on the acquired value of the inertia parameter being less than a reference value.

10. The display device of claim 1, wherein the processor is further configured to:
    display, on the display, a first GUI and a second GUI which are arranged adjacent to each other; and
    control the display to overlap a touch area for identifying a user touch on the displayed first GUI with a display area for displaying on the display the second GUI.

11. The display device of claim 10, wherein the processor is further configured to:
    receive, via the display, a user touch at an overlap area between the touch area for identifying the user touch on the displayed first GUI and the display area for displaying the second GUI; and
    execute an application corresponding to the first GUI based on receiving the user touch at the overlap area.

12. The display device of claim 1,
    wherein the processor is further configured to:
    identify a user operation to select a target GUI among the displayed at least one GUI; and
    change an area for identifying a user touch on the target GUI based on the identified user operation.

13. The display device of claim 12, wherein the processor is further configured to identify the target GUI based on the user operation being captured by an internal camera installed in the vehicle.

14. The display device of claim 12, wherein the processor is further configured to identify the target GUI based on a hovering inputted via the display.

15. The display device of claim 1, wherein the processor is further configured to:
    receive, via the first area of the display, a first user touch for executing an application;
    receive a second user touch for canceling the execution of the application within a preset time; and update the first area based on a coordinate of the first user touch.

16. The display device of claim 1, wherein the processor is further configured to:
receive a user touch on a third area which overlaps both a touch area corresponding to a first GUI and a touch area corresponding to a second GUI; and
execute an application corresponding to a GUI having a wider touch area overlapped by the user touch among the first GUI and the second GUI.

17. The display device of claim 1, wherein the processor is further configured to transfer a display area of the GUI corresponding to the second area.

18. A method for controlling a display device for a vehicle, the method comprising:
displaying at least one GUI on a display of the display device;
identifying a motion of the vehicle; and
based on the motion of the vehicle, controlling the display to transfer a first area for identifying a user touch on a GUI of the displayed at least one GUI to a second area of the display.

19. The method of claim 18, further comprising:
acquiring map information and sensing information; and
identifying the motion of the vehicle based at least partially on the acquired map information or the acquired sensing information,
wherein the map information includes a curvature and a flatness of a road corresponding to the vehicle.

20. The method of claim 18, further comprising:
acquiring a touch displacement according to the motion of the vehicle from a memory of the display device; and
controlling the display to transfer the first area to the second area based on the acquired touch displacement.

* * * * *